US008367147B2

(12) United States Patent
Poerschke

(10) Patent No.: US 8,367,147 B2
(45) Date of Patent: Feb. 5, 2013

(54) USE OF GELATIN PARTICLES IN POWDERED COATING PROCESSES

(75) Inventor: Ralf Poerschke, Neckargemünd (DE)

(73) Assignee: Gelita AG, Eberbach (DE)

( * ) Notice: Subject to any disclaimer, the term of this patent is extended or adjusted under 35 U.S.C. 154(b) by 31 days.

(21) Appl. No.: 12/885,636

(22) Filed: Sep. 20, 2010

(65) Prior Publication Data

US 2011/0027456 A1     Feb. 3, 2011

Related U.S. Application Data

(63) Continuation of application No. PCT/EP2009/052913, filed on Mar. 12, 2009.

(30) Foreign Application Priority Data

Mar. 20, 2008 (DE) .......................... 10 2008 015 961

(51) Int. Cl.
*A61L 33/00* (2006.01)

(52) U.S. Cl. ......... 427/2.22; 426/576; 426/92; 424/456; 427/2.14; 427/421.1; 427/424; 427/425

(58) Field of Classification Search ................... 426/576, 426/443, 92; 424/456; 514/17, 18, 19; 604/164; 427/2.22
See application file for complete search history.

(56) References Cited

U.S. PATENT DOCUMENTS

| | | | | |
|---|---|---|---|---|
| 3,930,052 A | | 12/1975 | De Brou et al. | |
| 4,546,002 A | * | 10/1985 | Leshik et al. | ................. 426/576 |
| 4,692,152 A | * | 9/1987 | Emde | ........................ 604/164.01 |
| 4,851,387 A | * | 7/1989 | Koike et al. | ................... 514/15.8 |
| 5,298,263 A | * | 3/1994 | Yatka et al. | ........................ 426/5 |
| 2004/0014631 A1 | | 1/2004 | Weber et al. | |
| 2006/0182798 A1 | * | 8/2006 | Shimokawa et al. | .......... 424/456 |

FOREIGN PATENT DOCUMENTS

| | | |
|---|---|---|
| CA | 2314363 | 1/2001 |
| DE | 22 64 154 | 7/1973 |
| DE | 199 34 254 | 1/2001 |
| EP | 0 279 682 | 8/1988 |
| EP | 0 826 746 | 3/1998 |
| EP | 2 045 319 | 4/2009 |
| GB | 895327 | 5/1962 |
| GB | 1166104 | * 9/1966 |
| GB | 1166104 | 10/1969 |
| JP | 58-194810 | 11/1983 |
| WO | WO 99/51715 | 10/1999 |
| WO | WO 02/49771 | 6/2002 |
| WO | WO 2004/101641 | 11/2004 |
| WO | WO 2005/072700 | 8/2005 |

OTHER PUBLICATIONS

R. Schrieber et al., *Gelatin Handbook, Theory and Industrial Practice*, Wiley-VCH, pp. 259-261 (2007).
G. I. Tseretely et al., *Journal of Thermal Analysis*, 38:1189-1201 (1992).

* cited by examiner

*Primary Examiner* — Dah-Wei Yuan
*Assistant Examiner* — Andrew Bowman
(74) *Attorney, Agent, or Firm* — Leydig, Voit & Mayer, Ltd.

(57) ABSTRACT

In order to provide an improved powder coating process using gelatin particles for the production of coatings or shaped bodies based on gelatin, it is proposed that the gelatin particles are produced by drying an aqueous gelatin solution, wherein the gelatin does not pass through a gel state before or during the drying.

13 Claims, No Drawings

USE OF GELATIN PARTICLES IN POWDERED COATING PROCESSES

The present invention relates to the use of gelatin particles in a powder coating process for the production of coatings or shaped bodies based on gelatin. The invention additionally relates to coatings or shaped bodies that are produced in such a process by using gelatin particles.

The production of coatings composed of gelatin plays an important role in many technical fields. In particular, the food industry, pharmaceutical industry and also the production of photographic films, photographic paper and special paper for inkjet printers (inkjet paper) should be mentioned in this context. By the selection of the raw materials and the respective production process of the gelatin the properties thereof such as gel strength and viscosity can be varied over a relatively broad range and can thus be adapted to the requirements of the respective area of use.

The production of gelatin coatings is usually conducted by applying an aqueous solution of the gelatin to the substrate to be coated and drying it to form the coating. In patent EP 0 279 682 A2 a process from the pharmaceutical field is described, for example, in which tablets (so-called caplets) are coated with a coating by dipping into a gelatin solution. The coating of photographic papers and inkjet papers is also conducted in most applications by using gelatin solutions (see e.g. R. Schrieber, H. Garrels: Gelatine Handbook, publishers WILEY-VCH 2007, page 259 et seq.).

Similarly, self-supporting shaped bodies can also be produced from gelatin by removing the dried gelatin layer from the substrate. An example of this is the production of gelatin hard capsules by dipping a mandrel into an aqueous gelatin solution.

In some cases, however, instead of using an aqueous gelatin solution, it would be desirable to produce the coating or shaped bodies by means of a powder coating process, in which a gelatin powder (i.e. dry gelatin particles) is applied to the surface of the substrate and then fused to form a coating. Such a process would have the advantage (in particular in the case of moisture-sensitive substrates) that the substrate only comes into contact with a substantially smaller quantity of water, as a result of which the time required for drying the coating would also be significantly reduced. This is also relevant from economic viewpoints, since the drying of an aqueous gelatin solution requires significant amounts of energy. A further disadvantage with aqueous gelatin solutions is a possible change in the gelatin during longer periods of storage because of hydrolysis, as a result of which it can be difficult to assure a reproducible quality of the produced coating.

In patent GB 1 166 104 a powder coating process using gelatin, inter alia, is described. In this case, a gelatin powder is applied to a metal surface and fused to form a continuous coating by the action of water vapour at 100° C. (page 6, left column, lines 45 to 52 of GB 1 166 104). However, also in this process the necessary water absorption by the gelatin is so high that a subsequent drying time of the coating of more than 30 minutes is necessary.

The object forming the basis of the present invention is to propose a powder coating process with gelatin, in which the above-described disadvantages are avoided.

This object is achieved according to the invention with the powder coating process of the aforementioned type in that gelatin particles are used that are produced by drying an aqueous gelatin solution, wherein the gelatin does not pass through a gel state before or during the drying.

It has surprisingly been found that the gelatin particles according to the invention, which are produced without passing through a gel state, are substantially more suitable for use in powder coating processes compared to conventional gelatin. The reason for this is presumably that the gelatin is present in these particles in a different structure, in particular in predominantly amorphous form.

In the case of conventional gelatin, the production is conducted by firstly cooling an aqueous gelatin solution obtained by extraction of the collagenous raw material, wherein the gelatin changes from the state of a colloidal solution (gelatin sol) with partial renaturation of the natural collagen structure into a gel state (gelatin gel). This gelatin gel, in which the gelatin molecules are present at least partially in a crystalline structure, is then dried in the form of bands (for the production of sheet gelatin) or noodles. The latter can then be ground into gelatin granules or powder.

In contrast, the gelatin particles according to the invention are distinguished in that the described gel state is not in fact passed through during the drying process, which can be achieved by drying the aqueous gelatin solution as rapidly as possible without being cooled. Preferred drying processes in this case are contact adhesive layer cylinder drying, spray drying and fluidised bed drying. In the latter process, the gelatin solution is sprayed onto solid nuclei composed of gelatin, which then grow to larger particles.

As a result of this type of drying and the different molecular structure of the gelatin resulting from this in the gelatin particles according to the invention, these are distinguished by a relatively high dependence of the softening point (glass transition point) on the water content. The water content of dried gelatin generally amounts to approximately 2 to 15% by weight. When conducting the powder coating process this water content must be increased (generally by the action of water vapour) to allow the gelatin particles to soften and fuse to form a coating. However, compared to conventionally dried gelatin, a lower temperature and/or a lower water absorption is already sufficient to cause this softening in the case of the gelatin particles according to the invention. Therefore, the formation of the coating can be conducted under milder conditions and the subsequently necessary drying time is reduced by the lower water absorption.

The size of the gelatin particles according to the invention can vary over a relatively broad range, and is naturally dependent on the type of application and in particular on the layer thickness of the coating to be produced or the shaped body to be produced. In particular, gelatin particles are used that have an average particle diameter of approximately 0.5 to approximately 500 µm, preferably approximately 5 to approximately 250 µm, further preferred approximately 10 to approximately 100 µm. Particles that are as small as possible are frequently desirable to obtain as homogeneous a coating as possible.

Depending on the drying method used for the production of the particles, these can already occur directly in the desired size (e.g. in the case of spray drying). In other cases (e.g. in contact adhesion layer cylinder drying) the particle size must still be reduced subsequently by grinding and/or screening the gelatin particles.

The gelatin particles according to the invention are preferably composed of gelatin in a predominant proportion, but can also contain further substances as additives without the advantageous properties described above with respect to the powder coating process being lost. The gelatin particles according to the invention preferably contain more than approximately 60% by weight of gelatin, further preferred more than approximately 80% by weight, most preferred more than approximately 95% by weight, in relation to the dry weight in each case.

According to a preferred embodiment of the invention the gelatin particles additionally contain a softener. As a result of this, the flexibility of the produced coatings or shaped bodies can be increased, which is desirable in many cases, e.g. in the coating of paper or in the production of gelatin capsules. Preferred softeners comprise e.g. alkylene glycol mono-$C_1$-$C_6$-alkyl ether, glycerine, polyalcohols, ethylene glycols, propylene glycols, polyethylene glycols, ethoxylated or propoxylated ethylene or propylene glycol esters or glycerine esters, glycerine triacetate, acetylated monoglycerides, triethyl citrate, tributyl citrate, acetyltriethyl citrate, acetyltributyl citrate, diethyl phthalate, glycerine carbonate, propylene carbonate as well as mixtures thereof.

The gelatin particles according to the invention can contain different further additives to influence the surface properties of the produced coating or shaped body, e.g. their lustre or haptics. Surface-active substances, in particular non-ionic surfactants (e.g. triton-X-100), anionic surfactants (e.g. alkyl sulphates) or also cationic surfactants should primarily be mentioned as such additives. Further possible additives are inorganic fillers (e.g. aluminium oxide, titanium dioxide or amorphous silicon dioxide) and/or organic fillers (in particular mono-, di-, oligo- and polysaccharides or their derivatives, e.g. isomalt, inulin, starch, microcrystalline cellulose and cellulose derivatives).

The additives are preferably incorporated into the gelatin particles by adding to the aqueous gelatin solution before it is dried to produce the particles.

The powder coating process, in which the gelatin particles are used according to the invention, preferably comprises the following steps:

a) applying the gelatin particles to a substrate;
b) subjecting the gelatin particles to the action of moisture and optionally heat in order to fuse them to form a coating or a shaped body;
c) drying the coating or the shaped body; and
d) optionally removing the shaped body from the substrate.

The application of the gelatin particles according to step a) is preferably conducted by means of spraying, in particular by means of an air flow, as is generally known in relation to powder coating processes. It is further preferred that the gelatin particles are electrostatically charged in this case, as a result of which a good adhesion and uniform distribution of the particles on the surface of the substrate is substantially assisted.

Subjecting the gelatin particles to the action of moisture and optionally heat according to step b) can be conducted in relatively mild conditions because of their special properties. This is particularly advantageous in the case of sensitive substrates and causes a reduction in the necessary drying time of the coating or shaped body as a result of the relatively low water absorption by the gelatin particles.

Step b) preferably comprises the action of water vapour on the gelatin particles. In this case, the conditions necessary for fusion of the particles can be varied, e.g. in dependence on the size and composition of the particles, in particular by means of the temperature and also the action time of the water vapour. Temperatures of approximately 60 to approximately 100° C. and also action times of approximately 3 to approximately 60 seconds are preferred in this case.

The coating formed according to step b) is preferably a continuous, e.g. closed, coating of the substrate. However, it is alternatively also possible to form only an incomplete, i.e. in particular a sectional or open-pored coating of the substrate by applying correspondingly smaller quantities of gelatin particles.

The drying of the coating or the shaped body according to step c) can also occur in mild conditions, in particular at room temperature. As stated above, as a result of the lower water absorption shorter drying times can be achieved compared to powder coatings with conventional gelatin.

In the case of the production of a shaped body, this is removed from the substrate (e.g. a mandrel in this case) in accordance with step d).

An aspect of the invention relates to the use of the gelatin particles according to the invention, as described above, for coating pharmaceutical preparations. These concern in particular tablets, film tablets or caplets, which are coated with a coating of gelatin.

A further aspect of the invention relates to the use of the gelatin particles according to the invention for the production of gelatin capsules, in particular gelatin hard capsules. In this case, individual capsule halves are respectively produced by coating a mandrel using the above process and are then filled with a pharmaceutical active substance.

Another aspect of the present invention relates to the use of the gelatin particles according to the invention to coat paper. This relates in particular to the coating of photographic paper and inkjet paper.

The present invention also relates to a coating or a shaped body, which is produced by using the gelatin particles according to the invention in a powder coating process, as described above.

These and further advantages of the invention are explained in more detail on the basis of the following examples, which should not, however, restrict the subject of the invention in any way.

EXAMPLE 1

The Production of Gelatin Particles by Contact Adhesion Layer Cylinder Drying

Gelatin particles according to the invention can be produced using the process of contact adhesion layer cylinder drying described below starting from an aqueous gelatin solution.

In this case, a gelatin solution (e.g. pigskin gelatin with 210 g of bloom) with a concentration of 25 to 50% by weight is heated to 50 to 70° C. and fed to the application mechanism of a contact adhesion layer cylinder dryer (cylinder temperature approximately 130° C.).

The gelatin flakes (water content approximately 2 to 10% by weight) formed during drying were ground into particles by means of a pin mill. Gelatin particles with an average particle diameter of approximately 67 μm (measured by light scattering) were obtained in this way.

EXAMPLE 2

Coating Inkjet Paper

The gelatin particles produced in accordance with Example 1 were used for coating a polyethylene-coated paper with a weight per unit area of approximately 160 g/m². Such PE-coated, non-absorbent papers are used in particular as inkjet paper.

The powder coating was conducted by means of a manual powder paint applicator from Wagner (BRAVO Airfluid). The gelatin particles were negatively charged by means of a gun and sprayed onto the paper surface at approximately 20° C.

for approximately 3 to 5 seconds. In this case, quantities of gelatin particles of 16.3 to 33 g/m² were applied to the substrate.

The paper covered with the gelatin particles was then subjected to the action of saturated water vapour (at 100° C. and normal pressure) for a period of 10 to 15 seconds in order to fuse the gelatin particles together.

The coated sheets of paper were then cooled to a temperature of approximately 20° C. and dried, wherein the coating was already dry after approximately 20 minutes and no longer sticky.

EXAMPLE 3

Comparison with Conventional Gelatin

To allow a direct quantitative comparison, a powder coating of a glass surface was conducted both with the gelatin particles according to the invention of Example 1 (contact adhesion layer cylinder drying) and also with a conventionally dried gelatin. The latter were gelatin particles of pigskin gelatin that were produced in a conventional manner by drying and grinding of a gelatin gel and screening to an average particle diameter of approximately 73 μm.

After the particles were applied to the glass surface in a quantity of approximately 100 g/m² in each case, both samples were subjected to saturated water vapour (at 100° C. and normal pressure). The time taken for the particles to be completely fused to form a continuous coating, which was an indication that the coating had become transparent, was measured in this case.

While this was the case after 30 seconds with the gelatin particles according to the invention, gelatin particles dried in the convention manner required an action time of 42 seconds. Moreover, it was shown that after this time the particles according to the invention had absorbed water in a quantity of approximately 76% of their weight, whereas the water absorption in the conventionally dried particles amounted to approximately 104% of their weight.

It should be noted that it was possible to further reduce the necessary action time of the water vapour by preheating the substrate covered with the particles. This was deliberately omitted in the test (the glass surfaces had a temperature of approximately 17 to 20° C.), so that the fusion of the particles proceeded more slowly overall and could be readily observed.

The test shows that by using the gelatin particles according to the invention, the formation of a continuous coating occurs more quickly and with lower water absorption, i.e. in milder conditions. As a result of the lower water absorption, the time and energy required in the subsequent drying of the coating is also reduced accordingly.

EXAMPLE 4

Production of Gelatin Particles by Spray Drying

This example describes an alternative production process of gelatin particles according to the invention by means of spray drying starting from an aqueous gelatin solution.

To produce the solution 250 g of pigskin gelatin (246 g of bloom, 10.7% by weight water content) were expanded in 2.4 l of cold water for approximately 30 minutes and then dissolved in a water bath at approximately 60° C. 13 g of an approximately 87% by weight aqueous glycerine solution were added to the solution as softener.

The gelatin solution (concentration approximately 9% by weight) was dried using a laboratory spray dryer from Büchi (190 Spray-Dryer) at an inflow of approximately 0.5 l/h, an inlet air temperature of 195° C. and with approximately 700 l/h of compressed air, wherein the aspirator ran at setting 5. An exhaust air temperature of approximately 96° C. occurred in this case.

A powder of gelatin particles according to the invention with a water content of approximately 5% by weight was obtained with a throughput of approximately 30 g/h in this case.

The gelatin particles produced in this way had an average particle diameter of less than approximately 40 μm.

EXAMPLE 5

Coating of Absorbent Paper

In this example sheets of paper with an absorbent surface and a weight per unit area of 250 g/m² (Schöller & Söhne) were coated with the gelatin particles produced in accordance with Example 4 (spray drying). The powder coating was conducted as described in Example 2, but with a smaller quantity of gelatin particles of approximately 2 g/m².

The necessary drying time to obtain a no longer sticky, satin-finish surface of the sheet of paper amounted to approximately 10 minutes in this case.

The invention claimed is:

1. A method for the production of a gelatin capsule, comprising:
   providing an aqueous gelatin solution;
   producing gelatin particles by drying the aqueous gelatin solution, wherein the gelatin does not pass through a gel state before or during the drying;
   applying the gelatin particles to a mandrel;
   subjecting the gelatin particles to the action of moisture and optionally heat in order to fuse them to form the gelatin capsule;
   drying the gelatin capsule; and
   optionally removing the gelatin capsule from the mandrel.

2. The method according to claim 1, wherein the gelatin is present in the gelatin particles in a predominantly amorphous form.

3. The method according to claim 1, wherein producing the gelatin particles comprises contact adhesive layer cylinder drying, spray drying or fluidised bed drying.

4. The method according to claim 1, wherein the gelatin particles have an average particle diameter of approximately 0.5 to approximately 500 μm.

5. The method according to claim 1, wherein the gelatin particles contain more than approximately 60% by weight of gelatin, in relation to the dry weight.

6. The method according to claim 1, wherein the gelatin particles further contain a softener.

7. The method according to claim 1, wherein the gelatin particles further contain a surface-active substance.

8. The method according to claim 1, wherein the gelatin particles further contain an inorganic and/or organic filler.

9. The method according to claim 1, wherein applying the gelatin particles to the mandrel comprises spraying the gelatin particles.

10. The method according to claim 1, wherein the gelatin particles are electrostatically charged to apply the gelatin particles to the mandrel.

11. The method according to claim 1, wherein b) comprises subjecting the gelatin particles to water vapour.

12. The method according to claim 11, wherein the water vapour has a temperature of approximately 60° C. to approximately 100° C.

13. The method according to claim 1, wherein the water vapour acts on the gelatin particles for approximately 3 to approximately 60 seconds.

* * * * *